Dec. 21, 1943.  G. E. ADAMS  2,337,436
SPREADING MACHINE
Filed Jan. 23, 1943   2 Sheets-Sheet 1
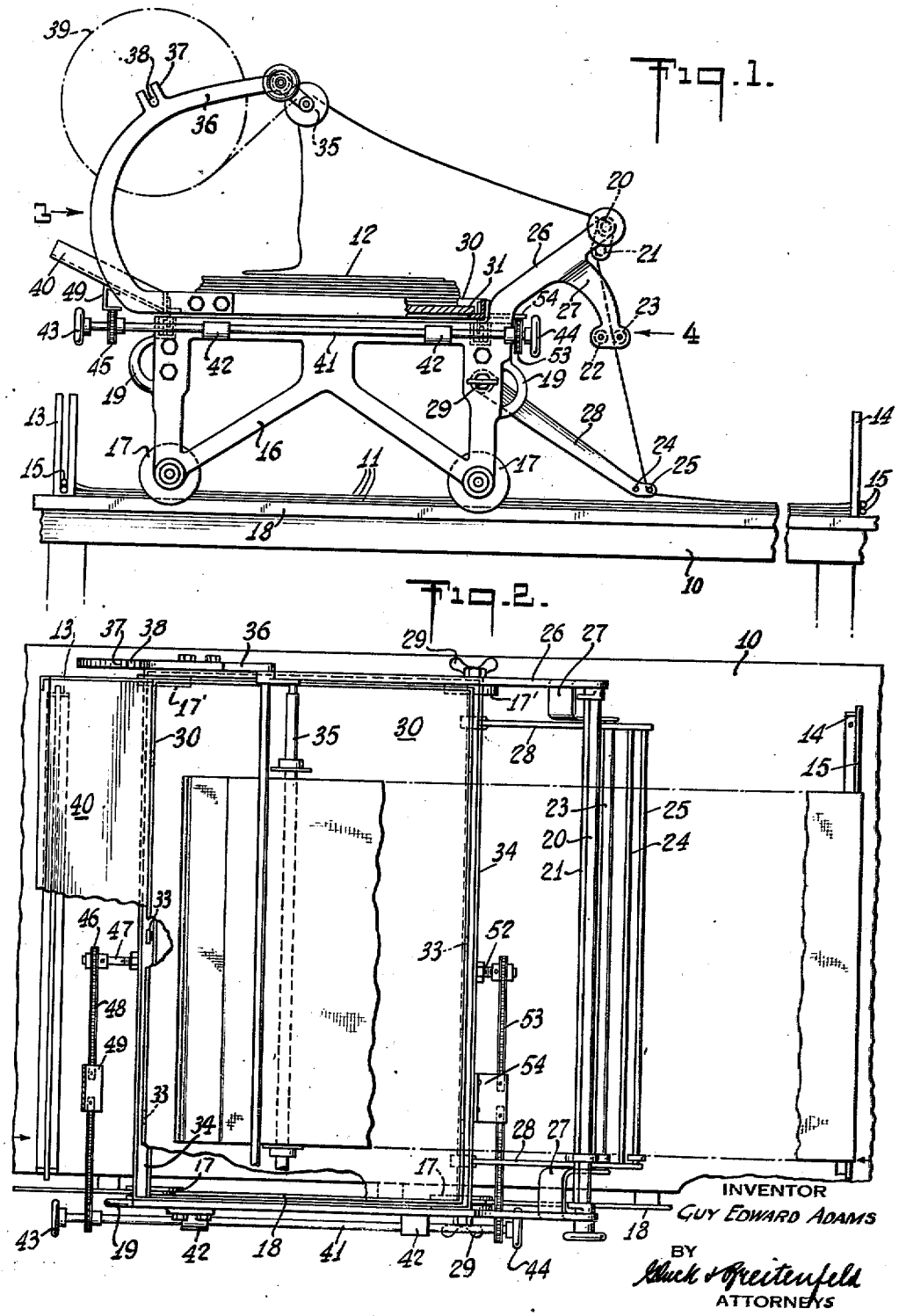
INVENTOR
GUY EDWARD ADAMS
BY
*Gluck & Breitenfeld*
ATTORNEYS Dec. 21, 1943.  G. E. ADAMS  2,337,436
SPREADING MACHINE
Filed Jan. 23, 1943  2 Sheets-Sheet 2

INVENTOR
GUY EDWARD ADAMS
BY
ATTORNEYS

Patented Dec. 21, 1943

2,337,436

UNITED STATES PATENT OFFICE 2,337,436

SPREADING MACHINE

Guy Edward Adams, Bellerose, N. Y., assignor to Cutting Room Appliances Corporation, New York, N. Y., a corporation of New York Application January 23, 1943, Serial No. 473,399

5 Claims. (Cl. 270—31)

My present invention relates generally to the handling of textiles or the like, and has particular reference to so-called spreading machines.

As an initial step in the manufacture of garments or other items, and for other analogous purposes, it is regular practice to lay or spread a fabric lengthwise upon an elongated table to enable the same to be inspected or measured, or to be cut into pieces of desired size and configuration. Quite commonly, the cloth or fabric is laid in superposed plies or layers so that mass cutting may be accomplished by electric cutting knives, die cutting machines or the like. The goods are available in the form of rolls or folded bundles, and because of the great weight involved the spreading procedure is customarily accomplished by means of a carrier upon which the material is supported and which is mounted for longitudinal movements along the table, the fabric being withdrawn from the carrier and spread or laid on the table, layer by layer, as the carrier is moved back and forth.

It is a general object of my invention to provide certain improvements in a machine of this character, whereby the spreading of the goods may be accomplished more speedily, with less labor, with greater accuracy and with consequent less loss of time and material, and at lower cost.

One of the problems heretofore encountered and not satisfactorily overcome arises from the difficulty of laying the goods in accurate alignment, layer by layer, because of inevitable irregularities in the initial rolls or bundles, and because of the great mass and weight of the material involved.

Heretofore, attempts to achieve a greater accuracy in this regard have required repeated adjustments of the spreading machine, each adjustment being relatively cumbersome and time-consuming and necessitating a complete stoppage of the spreading machine. To stop and start a heavy load of this character is wasteful of time and energy, and it has often been deemed a lesser evil to employ additional labor to rectify irregularities in the laying procedure by adjusting the fabric itself, ply by ply, as it is being spread.

It is an object of the present invention to obviate these inefficiencies, and to provide an improved means for achieving an accuracy of alignment of the goods by a relatively simple means, continuously controllable by the machine operator himself, without interrupting the spreading operation as a whole.

My invention is predicated upon a full understanding of the practical aspects of the art of fabric manipulation, of the capabilities and mode of functioning of spreading machines, and of the difficulties inherent in the handling of large and weighty quantities of material, as well as stretchable material and goods whose edge may be irregular.

Briefly stated, my invention involved an entirely practical and continuous transverse control of the fabric supply itself, as a simultaneous incident to the uninterrupted withdrawal of the fabric from the spreading machine. This I accomplish by providing the carrier with at least one transverse guide rail, and by supporting the fabric supply upon a platform which is in free rolling contact with this rail. By providing an accessible and easily-manipulable control member, coupled with a means which is responsive to the control member and which engages the platform, the desired transverse movements of the latter are easily effected.

This inter-relation of the component parts of the present improved machine allows a single operator, even though relatively unskilled, to control the laying of the goods continuously and accurately with surprisingly little effort, without having to stop the machine, and regardless of the weight which is being handled.

I achieve these general objectives, and such other objects and advantages as may hereinafter appear or be pointed out, in the manner illustratively exemplified in the accompanying drawings in which:

Figure 1 is a side view of a spreading machine embodying the features of the present invention;

Figure 2 is a top plan view of Figure 1 with parts broken away for the sake of clearness;

Figure 3:
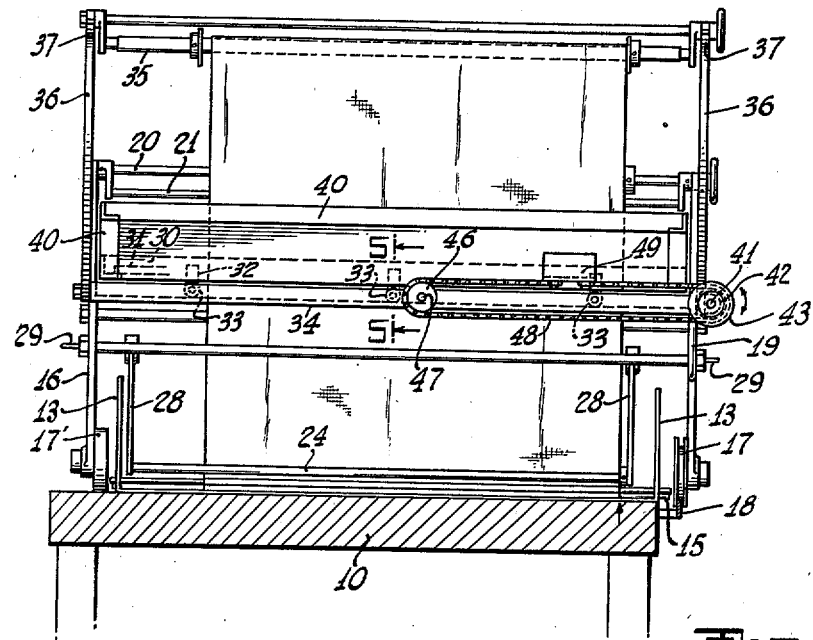
Figure 3 is an end view taken substantially in the direction indicated in Figure 1.
Figure 4:
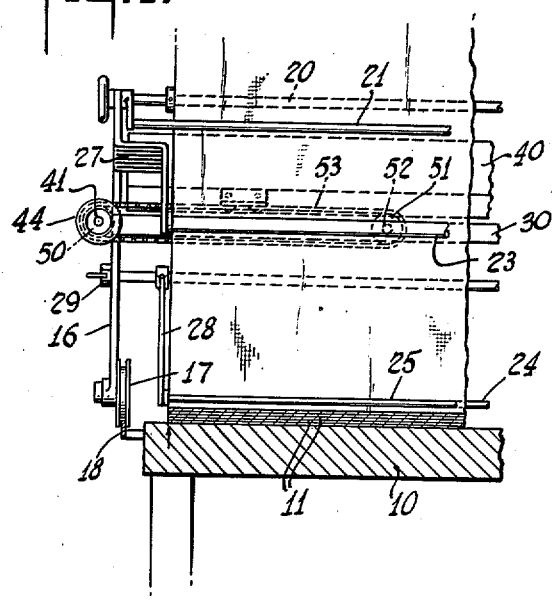
Figure 4 is a fragmentary end view taken substantially in the direction indicated in Figure 1.

It will be understood that the invention is applicable to spreading machines generally, regardless of their detailed structural nature or external appearance. The spreading machine which I have chosen for illustration herein is therefore to be construed merely as an example of one way in which such a spreading machine may be caused to incorporate the features and advantages of the present invention.

I have illustratively shown an elongated table 10 upon which there is intended to be spread or laid the superposed layers 11 of a fabric which is withdrawn, layer by layer, from a continuous length initially supplied in the form of a folded bundle 12. As the goods are laid out, the ends of the resultant stack of layers may be suitably engaged and held in position in any desired manner. I have illustratively shown a pair of stanchions 13 at one end and a similar pair 14 at the opposite end, holding rods 15 being inserted into the doubled-back ends of the fabric as it is laid, and braced against the corresponding pair of stanchions.

Mounted for guided longitudinal movement along the table is a carriage 16 which may be of any suitable construction. I have illustratively shown the carriage in the form of a metal framework provided with four wheels or rollers. At least one set of these wheels is preferably grooved so as to engage, for guiding purposes, with a longitudinal guide rail provided on the table 10. I have shown the wheels 17 engaging in this manner with a guide rail 18, while the opposite set of wheels 17' rests directly upon the flat surface of the table 10.

It is intended that the carriage 16 will be manually impelled for back and forth movements, along the table 10. To facilitate this operation, it is desirable to provide a set of handles 19 on the carriage adjacent to one side of the machine. Either of these handles may be employed by the operator, depending upon the direction of movement of the carriage and the direction in which the operator is facing at any instant of time.

To facilitate the laying of the goods, the carriage 16 may be provided with any suitable number of guide rods which direct the fabric in a neat and orderly fashion toward the table as it is withdrawn from the machine. This guide may be arranged in any of a variety of different ways, and by way of example, I have shown a series of guide rods 20, 21, 22, 23, 24, and 25. The guide rods 20 and 21 extend transversely across the machine between suitably shaped brackets 26, extending obliquely forwardly from the carriage; the guide rods 22 and 23 extend in parallel relationship across the machine between downward extensions 27 of the brackets 26; and the guide rods 24 and 25 extend in parallel relation across the machine between downwardly directed arms 28 adjustably secured, as at 29, to the carriage 16. The fabric may be directed over and around the guide rods 20 and 21, as shown, thence downwardly between the rods 22 and 23, and between the rods 24 and 25. When the carriage 16 is moving toward the left as viewed in Figure 1, the fabric bears against the guide rods 23 and 25 as it is laid upon the table. When the carriage is moving in the reverse direction, the fabric bears against the guide rods 22 and 24. The arms 28 may be adjusted into relatively raised or lowered positions depending upon the height of the stack of layers as they spread upon the table.

Figure 5:
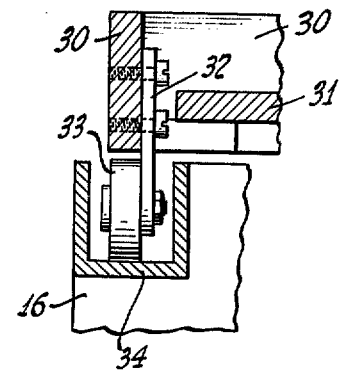
Figure 5 is an enlarged fragmentary view taken substantially along the line 5—5 of Figure 3.

In accordance with my invention, the bundle of fabric 12 is supported upon a special platform which is independently movable, transversely, with respect to the carriage 16. To accomplish this result in an entirely practical and workmanlike manner, I provide at least one transverse guide rail upon the carriage 16, and I mount the platform in free rolling contact with this guide rail. An illustrative example of one such arrangement of parts is shown most clearly in Figure 5.

The fabric-supporting platform which I have chosen to illustrate consists of a substantially rectangular frame 30 having a floor 31. Arranged beneath this platform, and secured thereto in any convenient manner (e. g., by brackets such as the bracket 32 shown in Figure 5) are a series of supporting wheels 33 mounted on antifriction bearings. Any suitable number of wheels may be provided, and I have illustratively shown the preferred use of six wheels, three arranged along the rear edge of the platform, and three arranged along the forward edge. One set of wheels rides upon a track or guide rail 34 which I have shown in the form of a channel provided along the rear upper edge of the carriage 16. The other set of wheels (not shown in Figure 5) rides within a similar guide channel. If desired, one or more of the wheels may be grooved (like the wheels 17 of the carriage 16) for rolling engagement with a correspondingly-shaped track. In any case, the platform is completely out of contact with the carriage 16 except for the engagement of the supporting wheel or wheels with the corresponding guide rail or tracks, as a result of which very little effort is required to effect movement of the platform, regardless of its weight, especially where the wheels are suitably provided with roller bearings or the equivalent thereof.

In the illustrated construction, the fabric bundle 12 is shown resting directly upon the floor 31 of the platform 30, and the fabric is directed upwardly over a suitable guide rod or roller 35 from which it extends forwardly toward the guide rod 20 previously referred to. The roller 35 extends transversely across the machine and is suitably supported between the ends of upwardly extending brackets 36 carried by the platform 30. To provide for the possible support of the fabric supply in the form of a roll, the brackets 36 are preferably furnished with the aligned bearings 37 adapted to receive the ends of a supporting rod 38 upon which the fabric may be rolled, as indicated by the dot-and-dash lines 39 shown in Figure 1. Similarly, to provide for a bundle of fabric which may be larger than the floor 31, the platform is preferably provided with an end extension 40 as shown most clearly in Figure 1.

In accordance with my invention, the transverse movements of the platform are controllable in an unusually simple and efficient manner. On the side of the machine along which the operator walks as he pushes the carriage longitudinally back and forth along the table, I provide a control shaft 41 mounted in suitable bearings 42. On this shaft are the two hand wheels 43 and 44, either of which may be used by the operator, the wheel 43 being purposely arranged in an accessible position closely adjacent to one of the handles 19, the wheel 44 being purposely arranged in an accessible position closely adjacent to the other handle 19. The hand wheels 43 and 44, together with the control shaft 41, constitute the control member by means of which the transverse movements of the fabric-supporting platform may be continuously regulated.

This continuous control is effected by a means which is responsive to the control member (i. e., to a manipulation of either of the hand wheels 43 and 44) and which engages the platform 30. While this means may be of any suitable character, I have found it preferable to employ a chain arrangement of the character herein illustrated. A sprocket 45 is mounted on the shaft 41, and an aligned idler sprocket 46 is mounted on a stub shaft 47 which is journaled in a suitable portion of the carriage 16. A chain 48 extends around these sprockets, and engages with the platform 30 at a point between them. The last-mentioned engagement may be accomplished by mounting a projecting piece 49 on the under-side of the platform and securing the chain 48 to this element as shown most clearly in Figure 3. This chain-sprocket mechanism is preferably duplicated at the opposite end of the carriage, and I have illustratively shown a sprocket 50 mounted on the shaft 41 and an aligned idler sprocket 51 mounted on a stub shaft 52, and a chain 53 extending around these sprockets and engaging the projecting piece 54 which is secured to the platform 30.

The operation of the machine is as follows: The supply of fabric is supported upon the platform 30, either by laying it upon the floor (if the fabric is available in the form of a folded bundle) or by supporting it upon the brackets 36 (if the fabric is available in the form of a roll). It is then threaded over the guide rod or roller 35, and over and around the other guide rods of the machine, and the free end is held down on the table 10 in any suitable manner. Usually, there is a longitudinal mark or line upon the table, adjacent to the edge at which the operator is positioned, which serves as a guide line along which the corresponding edge of the fabric is to be accurately laid. The carriage is then started in its longitudinal movement, as a result of which the fabric is withdrawn therefrom and is spread lengthwise upon the table. When the desired length has been laid, the fabric is engaged in any suitable way (e. g., by means of one of the rods 15), and the machine is moved in the opposite longitudinal direction. This process is repeated until the desired number of layers have been laid or spread on the table in superposed relationship. During these movements of the machine, the operator constantly keeps one hand on one or the other of the control wheels 43 and 44, and whenever he observes that the fabric edge is deviating or is about to deviate from the predetermined guide line, he merely rotates the hand wheel by a slight amount in either one or the other direction, thereby compensating for the irregularity and restoring the accuracy of alignment. The adjustments which he makes are slight, seldom exceeding an inch or so, and they are effected with surprisingly little effort, regardless of the weight of the fabric upon the platform. Of primary significance is the ability of the operator thus to maintain an accurate alignment of the goods without requiring any help from others, and without being compelled to halt the longitudinal movement of the carriage or slacken its speed.

The advantages of the present machine will be obvious to those skilled in the art. Not only may the fabric be laid or spread in a minimum of time and with a minimum of effort and manpower, but an accuracy of alignment may be maintained which results in great saving of material.

While I have illustrated and described my invention in the form of a complete spreading machine, it will be understood that certain features of my invention may be incorporated in spreading machines already on the market.

In general, it will be understood that the details herein described and illustrated may be modified by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:

1. In a spreading machine of the character described, a carrier mounted for longitudinal movement along an elongated table, a platform on the carrier adapted to support a supply of fabric which may be withdrawn therefrom and spread lengthwise upon the table as the carrier moves, said carrier being provided with at least one transverse guide rail, and said platform being mounted in free rolling contact upon said rail, whereby the alignment of said fabric as it is spread may be continuously controlled by transverse movements of said platform.

2. In a spreading machine of the character described, a carrier mounted for longitudinal movement along an elongated table, a platform on the carrier adapted to support a supply of fabric which may be withdrawn therefrom and spread lengthwise upon the table as the carrier moves, said carrier being provided with at least one transverse guide rail, said platform being mounted in free rolling contact upon said rail, a control member arranged in a position accessible to an operator of the machine, and means responsive to said control member and engaging said platform for moving the latter along said transverse rail, whereby the alignment of said fabric as it is spread may be continuously controlled by such transverse movements of said platform.

3. In a spreading machine of the character described, a carrier mounted for longitudinal movement along an elongated table, a platform on the carrier adapted to support a supply of fabric which may be withdrawn therefrom and spread lengthwise upon the table as the carrier moves, said carrier being provided with at least one transverse guide rail, said platform being mounted in free rolling contact upon said rail, a handle on the carrier by means of which an operator of the machine may move the carrier along the table, a control member adjacent to said handle, and means responsive to said control member and engaging said platform for moving the latter along said transverse rail, whereby the alignment of said fabric as it is spread may be continuously controlled by such transverse movements of said platform.

4. In a spreading machine of the character described, a carrier mounted for longitudinal movement along an elongated table, a platform on the carrier adapted to support a supply of fabric which may be withdrawn therefrom and spread lengthwise upon the table as the carrier moves, said carrier being provided with at least one transverse guide rail, said platform being mounted in free rolling contact upon said rail, a control member arranged in a position accessible to an operator of the machine, and means responsive to said control member and engaging said platform for moving the latter along said transverse rail, whereby the alignment of said fabric as it is spread may be continuously controlled by such transverse movements of said platform, said means comprising a driving sprocket actuated by said control member, an idler sprocket, and a chain extending around said sprockets and engaging said platform at a point between them.

5. In a spreading machine of the character described, a carrier mounted for longitudinal movement along an elongated table, a platform on the carrier adapted to support a supply of fabric which may be withdrawn therefrom and spread lengthwise upon the table as the carrier moves, said carrier being provided with at least one transverse guide rail, said platform being mounted in free rolling contact upon said rail, a control member arranged in a position accessible to an operator of the machine, and means responsive to said control member and engaging said platform for moving the latter along said transverse rail, whereby the alignment of said fabric as it is spread may be continuously controlled by such transverse movements of said platform, said control member comprising a control shaft, and a pair of optionally-usable handwheels operatively associated with said shaft, one wheel being accessible to the operator when facing in one longitudinal direction, the other being accessible to the operator when facing in the opposite longitudinal direction.

GUY E. ADAMS.